United States Patent [19]

Leydon et al.

[11] 3,708,331
[45] Jan. 2, 1973

[54] COMPOSITION FOR SEALING CONTAINED STERILIZED FOODS

[75] Inventors: Arthur J. Leydon, Waltham, Mass. 02154; Mannie Brenner, Cambridge, Mass. 02139; Fred L. Chase, Arlington, Mass. 02174

[73] Assignee: W. R. Chase & Co., Cambridge, Mass.

[22] Filed: Nov. 13, 1970

[21] Appl. No.: 89,494

[52] U.S. Cl. ............... 117/95, 117/105.3, 117/162, 117/168, 260/27 BB, 260/33.4 R, 260/33.6 A, 260/41.5 A, 260/894
[51] Int. Cl. .............................................. B44d 1/08
[58] Field of Search..... 117/95, 162, 163, 101, 105.3; 260/33.4 R, 33.6 A, 27 R, 27 BB, 894, 41.5 A

[56] References Cited

UNITED STATES PATENTS

| | | |
|---|---|---|
| 2,947,710 | 8/1960 | Frantz..............................260/27 R |
| 3,320,695 | 5/1967 | Moore.............................260/27 R |
| 3,607,362 | 9/1971 | Cormack..............................117/95 |

Primary Examiner—Edward G. Whitby
Attorney—Metro Kalimon, William L. Baker and C. E. Parker

[57] ABSTRACT

A thermoplastic composition for high temperature short-time process in can sealing which comprises an elastometer dispersed in a volatile organic solvent system and includes a fossil resin to improve the sealing performance of the composition when exposed to temperatures of the order in excess of about 200°C.

2 Claims, No Drawings

COMPOSITION FOR SEALING CONTAINED STERILIZED FOODS

Of the various methods of preserving food, only one — sterilization by heat — aims at the complete destruction of all bacterial life. The others merely reduce the number of organisms or produce such conditions that their development or activity is prevented. In the process of sterilization, the food is heated rapidly to temperatures ranging between about 120° to 150°C. varying according to the nature of the food, cooled rapidly, followed by sealing into sterile containers under aseptic conditions.

In general, the food is quickly heated to sterilization, cooled and then passed in a sterile condition to a container filling station. The containers, such as tin cans, are sterilized with superheated steam at 230° to 290°C. for about 90 seconds. The can ends are also sterilized with superheated steam at the same temperature and for the same length of time. The cool sterile product is filled into the sterile cans and the filled cans are conveyed to a closing machine where the sterile ends are applied to seal the can. An atmosphere of superheated steam is maintained in the filler, closing machine and interconnecting conveyor systems to maintain sterility and to prevent entry of air-borne bacteria.

Compositions of various sorts, such as rubber solutions and rubber latices, are used to provide a seal between a can body and a can end to preserve the contained food product. A selected composition is applied by lining the peripheral channel of a can end which, upon drying, is transformed into a continuous sealing gasket. In the conventional method of processing food, the food is placed in the can, the can end containing the sealing gasket is double seamed to the flange of the can, and then the food is heat processed in the sealed can.

In conventional food processing, complete bacteriological sterility, while sometimes attained, is not always essential in canned products provided that conditions in the can are such that no growth of residual organisms will occur. Since a processing temperature is used which is lower than that employed in the sterilization technique the sealing compositions of commerce have been satisfactory.

However, such thermoplastic sealing compositions have not been entirely satisfactory when used in the sterilization method due to the high temperatures employed. The high temperature used to sterilize the can end tends to soften the lined sealing gasket and consequently when the end is applied to the sterile can during the double seaming operation, the softened gasket is squeezed out of place resulting in an unsightly appearance on the can and frequently the amount of gasket so displaced is such as to adversely affect the seal.

It is, therefore, an object of this invention to provide a thermoplastic sealing composition which when used as a gasket will withstand the high temperatures employed in canning sterilized foods. This objective is achieved by including in the composition a fossil resin having a high melting point. In general, the composition is comprised of an elastomer dissolved in a volatile organic solvent wherein the fossil resin is present in amounts ranging between about 5 and 20 parts by weight per hundred parts by weight of the elastomer. When an amount of less than 5 parts of the resin is used the resulting gasket is too hard thus reducing its resilient nature with a consequent impairment in sealing efficiency. On the other hand, use of amounts in excess of 20 parts results in a gasket which is frangible thereby being subject to breakage which will adversely affect if not destroy its sealing performance. The composition may be modified by the inclusion of other additives such as fillers, coloring agents, anti-oxidants and other ingredients to enhance processing of the composition as well as to impart desirable properties to the resulting gaskets. The elastomers which are suitable in the compositions of this invention are comprised of 60–40 parts by weight of polychloroprene (polymeric 2-chloro-1,3-butadiene) in admixture with 40–60 parts by weight of a 45–65 butadiene-35–55 styrene copolymer, the sum of the two polymers being 100 parts by weight. A good blend of polymers for sealing sterilized food containers is composed of a mixture of about 55 parts by weight of polychloroprene and 45 parts by weight of a 50–50 styrene-butadiene copolymer.

The selection of a solvent for use in the compositions depends upon the solubility characteristics of the elastomer employed. Though different elastomeric polymers may be soluble in the same solvent, polymers derived from different chemical sources usually behave very differently in a given solvent. Likewise, polymers from the same chemical source but having different ratios of monomers in the resulting copolymers or different molecular weight due to a different degree of polymerization may be soluble or insoluble in a given solvent.

The suitability of a particular solvent is not dependent on its boiling point. For example, a composition which includes a solvent having a low boiling point may be lined in a can end and dried to a cohesive gasket at room temperature. If the composition contains a solvent having a high boiling point, the lined can end may be dried in a heated oven whereby the solvent is volatilized.

Suitable solvents which may be employed in preparing solutions of elastomers include aliphatic and aromatic hydrocarbons, for example, 3-methylheptane, hexane, heptane, xylene and toluene; chlorinated hydrocarbons, such as dichloropentane; ketones; ethers, ether-alcohols, and mixtures of these and other volatile organic liquids which together form media as known in the art for the selected elastomers.

The amount of solvent used will depend on the maximum total solids concentration obtainable in the final composition consistent with solubility of the elastomer, ease in preparing the composition, storage stability of the composition, and application of the composition to the can end using high speed automatic lining equipment. In general, the amount of solvent employed is such as to yield a composition having a solids content ranging between about 35 percent and 65 percent by weight.

The fossil resin in the present compositions imparts desirable thermoplasticity and provides tack to the resulting sealing gaskets which makes such gaskets eminently suitable in can sealing operations at sterilization temperatures. A particularly useful resin is one which occurs as a component of coal deposits in Utah. It is separated from the coal by suitable means, such as froth flotation, and processed to usable form. The resin is predominantly a hydrocarbon, it is soluble in both aliphatic and aromatic liquids, and is characterized by the following analysis:

| | |
|---|---|
| Hydrogen | 11.00% |
| Carbon | 87.04% |
| Refractive index | 87.04% |
| Refractive index | 1.544 |
| Specific gravity (melted) | 1.03–1.06 |
| Acid number | 6–8 |
| Softening point (Ball and Ring Method) | 160°C. min. |
| Iodine value (Wijs) | 140–160 |
| Average molecular weight | 732 |

The compositions of this invention may include additional ingredients such as fillers which are conventionally employed in the rubber compounding art. Illustrative fillers include carbon black, talc, barytes, asbestine, hydrated calcium silicate, silicon dioxide, and whiting. Clays are especially suitable since they impart a comparatively greater degree of strength to the dried composition. Pigments such as titanium dioxide and yellow iron oxide may be added to provide a desired color.

Other ingredients which may be incorporated into the compositions include lubricants, for example, stearic acid; plasticizers, such as dioctyl phthalate and dioctyl sebacate; wetting agents such as lecithin and zinc resinate; and antioxidants, such as diphenyl-p-phenylene diamine and 2,2'-dihydroxy-3,3'-di-($\alpha$-methylcyclohexyl)-5,5'-dimethyl-diphenyl-methane (Nonox WSP).

In preparing the present composition, the ingredients such as the elastomer, fillers, fossil resin and other components which will be used to make the composition, except the solvent, are blended together using suitable mixing apparatus. The solvent is then added to the blend whereupon a fluid mixture is obtained. The mixture is then thoroughly homogenized. The resulting composition is quite stable in that it does not settle or gel prematurely when stored for several weeks.

The invention is further illustrated by the following examples.

EXAMPLE 1

A sealing composition was prepared which contained the following ingredients:

| Ingredient | Parts by Weight |
|---|---|
| Poly 2-chloro-1,3-butadiene | 55.60 |
| A 50-50 styrene-butadiene copolymer | 44.40 |
| Light calcined magnesium oxide | 3.53 |
| Nonox WSP (antioxidant) | 1.41 |
| Yellow Iron oxide | 4.51 |
| Titanium dioxide | 7.61 |
| Buca clay | 89.16 |
| Utah fossil resin (hereinbefore described) | 15.00 |
| Solvent system: | |
| Hexane | 213.30 |
| Toluene | 71.10 |
| Isopropanol | 8.85 |

The mixture of elastomers, magnesium oxide, Nonox WSP, yellow iron oxide, titanium dioxide and about 35 parts of the clay were charged to a Banbury mixer over a period of three minutes while maintaining the temperature below 240°F. About 25 parts of additional clay were added and the batch was mixed for one minute following which the remaining clay was added and mixing was continued for about 4 minutes. The batch was then milled for about 4 minutes to form sheets of the compounded rubber having a thickness of about one-half inch after which the sheets were cut into strips and then chopped into small fragments.

The fossil resin was dissolved by the solvent mixture in a separate vessel while these components were being thoroughly agitated. The chopped compounded rubber fragments were then added and the entire mixture was agitated until a solution free of lumps was obtained. The solution was transferred to a blending tank where additional hexane and toluene in a weight ratio of 3:1 were added to adjust the total solids content of the solution to between about 45 and 47 percent. The batch was cooled to approximately 100°F. and then it was thoroughly homogenized while maintaining the temperature below 110°F.

The resulting composition has a tendency to gel if it is allowed to stand. To prevent gelation, an amount of isopropanol is added to adjust the total solids content of the composition to between about 41 and 44 percent. The adjusted composition remains stable over prolonged storage periods.

The final composition had the following 44% at specific

| | |
|---|---|
| Total solids | 41–44% |
| Viscosity | 2400–3000 cps (Brookfield at 70° F.) |
| Color | yellow |
| Specific gravity | 1.54 |

EXAMPLE 2

Another composition was prepared using less fossil resin and composed of the following ingredients:

| Ingredient | Parts by Weight |
|---|---|
| Poly 2-chloro-1,3-butadiene | 55.6 |
| A 52/48 styrene-butadiene copolymer | 44.4 |
| Light calcined magnesia | 3.5 |
| Nonox WSP (antioxidant) | 1.4 |
| Yellow Iron oxide | 4.5 |
| Titanium dioxide | 5.7 |
| Soya Lecithin | 2.0 |
| Kaolin clay | 89.1 |
| Utah fossil resin | 9.2 |

| Solvent system | |
|---|---|
| Hexane | 195.0 |
| Toluene | 65.0 |
| Isopropanol | 15.0 |

The procedure of Example 1 was followed in preparing this composition except that the soya lecithin was added during the second clay addition. The final composition had the following properties:

| | |
|---|---|
| Total solids | 44% |
| Viscosity | 2000–3000 cps (Brookfield at 70°F.) |
| Color | yellow |
| Specific gravity | 1.54 |

Sealing gaskets are formed by lining can ends with the requisite amount of composition and thereafter driving off the solvent in the composition to form a dry film. A satisfactory method involves the use of automatic lining equipment wherein the composition is deposited through a valved nozzle onto the annular sealing area of a can end which is rotated rapidly beneath the nozzle. Thereafter, the lined end is exposed to air or passed through a heated oven to evaporate the solvent whereby the gasket assumes the form of a dry cohesive film. The lined end is then double seamed to a container bearing the food product.

EXAMPLE 3

The composition of Example 1 was deposited in a series of No. 208 diameter can ends and the composition was dried in each end to yield a gasket having an average film weight of 66 mgs. Cans were sterilized with superheated steam to a temperature ranging between 500°–510°F. and were cooled to a temperature between 300°–350°F. before being filled with the product. The product which consisted of whole milk having 3 percent by weight of added sugar was sterilized by exposure to superheated steam to a temperature of 292°F. held at that temperature for 8 seconds, and then cooled to 50°F. The lined ends were sterilized in a chamber by steam superheated to 460°F. The product was passed into the sterile cans, sterile lids were applied to the open ends of the cans and the lids were double seamed to the cans. The filling and seaming operations were carried out under aseptic conditions.

The sealing efficiency of the compositions which were used to seal the cans as described in Example 1 was tested to ascertain the amount which would be squeezed out of the seam during the seaming operation. Using an arbitrarily-defined criterion, the test involved counting the number globules of composition which exuded from the seamed area when the seam was formed. Applying a scale ranging from 0 to 10 wherein 10 represents the formation of a continuous bead of composition exuding from the can seam, the composition of this invention was rated as 0.9. This low quantity of exudation is indicative of an excellent seal which prevents the entrance of contaminants into the container during transit and storage.

We claim:

1. A can end which includes a gasket in its sealing area, said gasket being a dried film of a composition comprising 100 parts by weight of a mixture of elastomers consisting of 60–40 parts by weight of a polychloroprene and 40–60 parts by weight of a butadiene-styrene copolymer dispersed in a volatile organic solvent, and 5–20 parts by weight based on 100 parts by weight of the mixture of elastomers of a hydrocarbonaceous fossil resin characterized by the following analysis:

| | |
|---|---|
| Hydrogen | 11.00% |
| Carbon | 87.04% |
| Refractive index | 1.544 |
| Specific gravity (melted) | 1.03–1.06 |
| Acid number | 6–8 |
| Softening point (Ball and Ring Method) | 160°C min. |
| Iodine value (Wijs) | 140–160 |
| Average molecular weight | 732 |

2. A can end which includes a gasket in its sealing area, said gasket being a dried film of the composition used in claim 1, wherein the mixture of elastomers is composed of about 55 parts polychloroprene and 45 parts of a 50–50 butadiene-styrene copolymer.

* * * * *